(12) United States Patent
Forman

(10) Patent No.: US 7,720,781 B2
(45) Date of Patent: May 18, 2010

(54) FEATURE SELECTION METHOD AND APPARATUS

(75) Inventor: George Henry Forman, Port Orchard, WA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2022 days.

(21) Appl. No.: 10/354,844

(22) Filed: Jan. 29, 2003

(65) Prior Publication Data

US 2004/0148266 A1 Jul. 29, 2004

(51) Int. Cl.
   G06F 17/00 (2006.01)
   G06N 5/02 (2006.01)
(52) U.S. Cl. ........................................ 706/46
(58) Field of Classification Search .............. 706/1, 706/15, 45; 700/1, 90; 709/105; 702/19; 365/200; 395/20; 382/171
   See application file for complete search history.

(56) References Cited

U.S. PATENT DOCUMENTS

| | | | |
|---|---|---|---|
| 5,649,061 A * | 7/1997 | Smyth ......................... 706/16 |
| 5,956,707 A | 9/1999 | Chu | |
| 6,038,527 A | 3/2000 | Renz | |
| 6,054,991 A | 4/2000 | Crane et al. | |
| 6,101,275 A | 8/2000 | Coppersmith et al. | |
| 6,182,058 B1 | 1/2001 | Kohavi | |
| 6,182,070 B1 | 1/2001 | Megiddo et al. | |
| 6,192,360 B1 | 2/2001 | Dumais et al. | |
| 6,212,532 B1 | 4/2001 | Johnson et al. | |
| 6,278,464 B1 | 8/2001 | Kolhavi et al. | |
| 6,445,390 B1 | 9/2002 | Aftosmis et al. | |
| 2002/0133668 A1 | 9/2002 | Sherman | |
| 2002/0147546 A1 * | 10/2002 | Kanevsky et al. ............ 702/19 |
| 2002/0194251 A1 * | 12/2002 | Richter et al. .............. 709/105 |
| 2002/0196679 A1 * | 12/2002 | Lavi et al. .................. 365/200 |
| 2002/0196975 A1 * | 12/2002 | Cahill ....................... 382/171 |

OTHER PUBLICATIONS

A. McCallum, "Bow: A Toolkit for Statistical Language Modeling, Text Retrieval, Classification and Clustering," http://www.cs.cmu.edu/~mccallum/bow/, pp. 1-2 (Sep. 12, 1998).
A. McCallum, "Rainbow," http://www.cs.cmu.edu/~mccallum/bow/rainbow/, pp. 1-12 (Sep. 30, 1998).
U.S. Appl. No. 10/253,041, filed Sep. 24, 2002, George Henry Forman.
Yang, Yiming et al. "A Comparative Study in Feature SElection in Text Categorization", Carnegie Mellon University and Verity, Inc., 9 pages (1997).
Dietterich, Thomas G., et al., "Solving Multiclass learning Problems via Error-Correcting output Codes", Journal of Artificial Intelligence Research 2 pp. 263-286 (Jan. 1995).

* cited by examiner

*Primary Examiner*—Donald Sparks
*Assistant Examiner*—Peter Coughlan

(57) ABSTRACT

A feature selection method for selecting a predetermined number of features, the method may comprise for each category, ranking features according to feature ranking for two-category problems; and while the predetermined number of features has not yet been selected: picking a category c; selecting a feature based on the ranking for category c; and adding the selecting feature to an output list if not already present in the output list and removing the selected feature from further consideration for the category c. An apparatus and computer program code are also provided.

32 Claims, 6 Drawing Sheets

36 CLASSES OF THE CORA DATASET

| SPAM | NEWS SUBSCRIPTION | OTHER |
|---|---|---|
| FREE<br>YOU<br>YOUR<br>MONEY<br>FAST | CNN<br>NEWS<br>WEATHER<br>KD NUGGETS<br>IRAQ | PROJECT<br>MEETING<br>PATENT<br>YOU<br>RE: |

FIG. 6

| ROUND ROBIN |
|---|
| FREE<br>CNN<br>PROJECT<br>YOU<br>NEWS<br>MEETING<br>YOUR<br>WEATHER<br>PATENT<br>MONEY<br>KD NUGGETS |

FIG. 7

PRIORITY SCHEDULING
PROJECT
MEETING
PATENT
FREE
CNN
YOU
YOUR
NEWS
RE:
•
•
•

FEATURE SELECTION METHOD AND APPARATUS

FIELD OF THE INVENTION

The disclosure relates to machine learning. The disclosure also relates to text classification or categorization.

BACKGROUND OF THE INVENTION

Text classification techniques are known in the art. Attention is directed, for example, to U.S. Pat. No. 6,182,058 to Kohavi; U.S. Pat. No. 6,278,464 to Kohavi et al.; U.S. Pat. No. 6,212,532 to Johnson et al.; U.S. Pat. No. 6,192,360 to Dumais et al.; and U.S. Pat. No. 6,038,527 to Renz, all of which are incorporated herein by reference. These patents discuss classification systems and methods.

Many data mining or electronic commerce tasks involve classification of data (e.g. text or other data) into classes. For example, e-mail could be classified as spam (junk e-mail) or non-spam. Mortgage applications could be classified as approved or denied. An item to be auctioned could be classified in one of multiple possible classifications in on-line auction web sites such as eBay™. Text classification may be used by an information service to route textual news items covering business, sports teams, stocks, or companies to people having specific interests.

There are multiple different types of classification methods. Some classification methods are rule-based methods. A rule of the form IF {condition} THEN {classification} could be used. However, rule-based systems can become unwieldy when the number of input features becomes large or the logic for the rules becomes complex.

Some classification methods involve use of classifiers that have learning abilities. A classifier is typically constructed using an inducer. An inducer is an algorithm that builds the classifer using a training set comprising records with labels. After the classifier is built, it can be used to classify unlabeled records. A record is also known as a "feature vector," "example," or "case."

The term "feature selection" refers to deciding which features are most predictive indicators to use for training a classifier. In some embodiments, "feature selection" refers to which words or features score the highest Information Gain, Odds Ratio, Chi-Squared, or other statistic. Well chosen features can substantially improve classification accuracy or reduce the amount of training data needed to obtain a desired level of performance. Avoiding insignificant features improves scalability and conserves computation and storage resources for the training phase and post-training use of the classifier. Conversely, poor feature selection limits performance since no degree of clever induction can make up for a lack of prediction signal in the input features sent to the classifier.

Known methods for feature selection include Information Gain (IG), Odds Ratio, Chi Squared, and others. Known classifiers include Support Vector Machines and Naïve Bayes.

The problem of selecting which features to use in a text classification problem where there are multiple categories can be more difficult than in two-category classification systems. For example, given a machine learning problem of classifying each new item to be auctioned into the most appropriate category in the large set of an auction web site's categories, it is desirable to decide which word features are the most predictive indicators to use for training a classifier.

BRIEF DESCRIPTION OF THE VIEWS OF THE DRAWINGS

Embodiments of the invention are described below with reference to the following accompanying drawings.

FIG. 6 is a table illustrating example features and categories.

FIG. 7 is a table illustrating operation of methods in accordance with various embodiments or of the system of FIG. 5.

FIG. 8 is a table illustrating operation of methods in accordance with various alternative embodiments or of the system of FIG. 5.

DETAILED DESCRIPTION

Attention is also directed to a U.S. patent application Ser. No. 10/253,041, titled "Feature Selection For Two-Class Classification Systems," naming as inventor George H. Forman, assigned to the assignee of the present application, and incorporated herein by reference.

The inventor has determined that existing text feature selection methods may be subject to a pitfall: if there is one or several "easy" categories that have many very good predictors for them, and there is another or several "difficult" categories that only have weak predictors for them, existing techniques will be drawn to the many features for the easy categories and will ignore the difficult categories, even if those difficult categories are large and will have a substantial impact on the classifier's performance. This even happens for feature selection methods that compute the maximum score, e.g. Information Gain, over each category vs. all other categories. The terms category and class are used herein interchangeably.

A method and apparatus have been developed to overcome this problem. To select the best k features for a text classification problem, given training examples for each of N classes or categories (e.g., 50 example product descriptions for each auction house category), the following steps are performed in various embodiments. (In common practice, one may try a variety of values for k, but 100 to 1000 is a range used in various embodiments).

Figure 1:
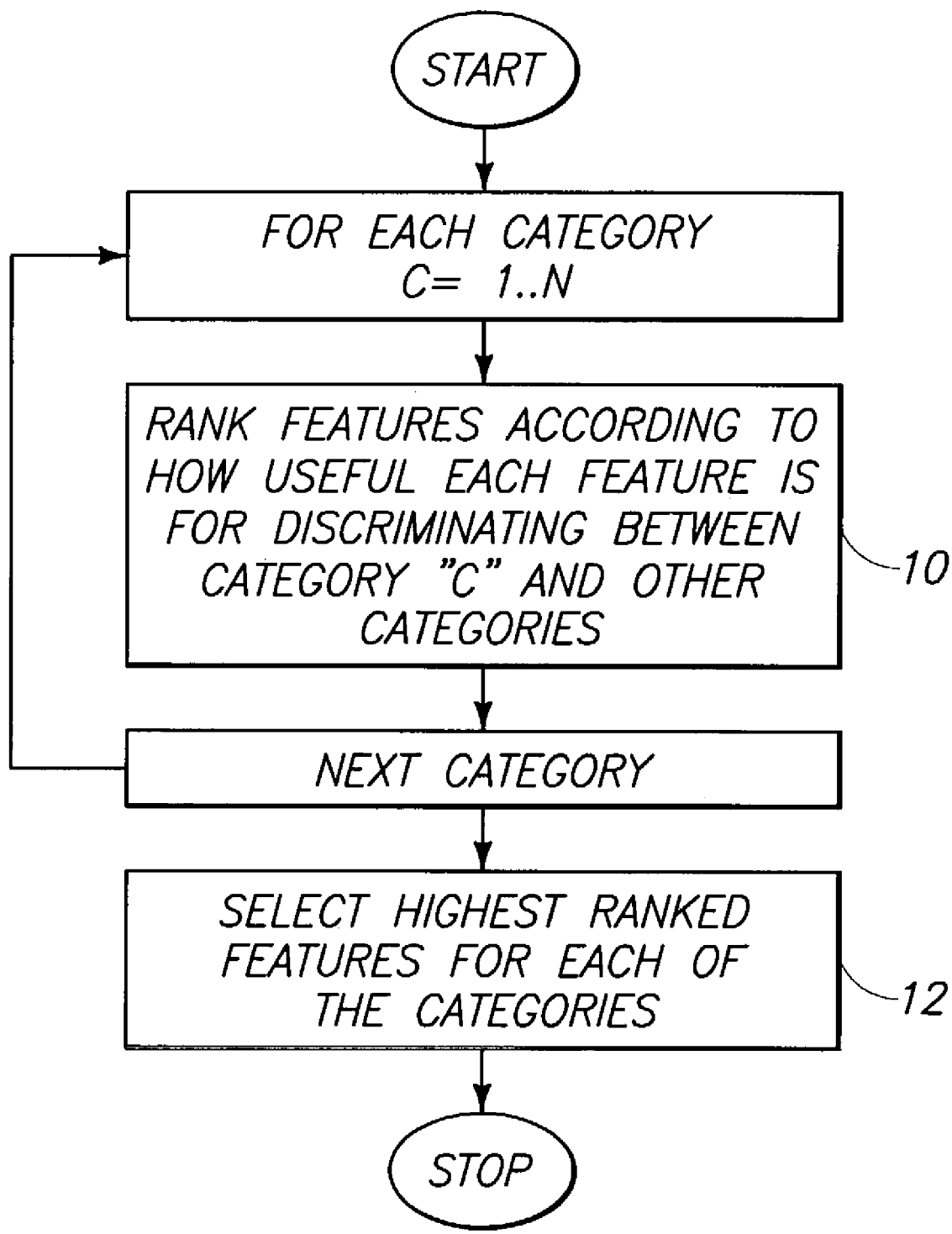
FIG. 1 is a flowchart illustrating a method in accordance with various embodiments.

FIG. 1 is a flowchart illustrating a method in accordance with various embodiments that will now be described.

In step 10, for each category C (or binary partition p), all potential features may be ranked according to how useful each is for discriminating between category C (binary partition p) and all other categories. Note that the feature ranking of step 10 only need deal with a 2-class problem (discriminating between category C and not category C) and this opens up the possibility even on multi-class problems to use 2-class techniques. In some embodiments, the metrics described in the above incorporated patent application Ser. No. 10/253, 041 are used, comprising Bi-Normal Separation. In other embodiments, traditional methods, such as Information Gain, Chi-Squared, Odds Ratio, Document Frequency, Fisher's Exact Test or others are used. Note that the feature ranking sub-problems for respective categories may be computed independently and are amenable to parallelization In various embodiments, Bi-Normal Separation for a feature is defined as: $|F^{-1}(tpr)-F^{-1}(fpr)|$; where $F^{-1}$ is the standard Normal distribution's inverse cumulative probability function; where tpr is true-positive-rate for the feature, a.k.a. P (feature appears|positive class); and where fpr is false-positive-rate for the feature, a.k.a. P (feature appears|negative class).

In step 12, the top feature is selected from each of the N ranked lists, then the second, et seq.; e.g., in a round-robin fashion until k features have been selected. Round-robin simply takes the best feature from each class in turn.

In alternative embodiments, "rand"-robin is employed instead of round-robin for step 12. Rand-robin means that after a feature is taken, the next class is selected randomly with probabilities according to class distribution. If the importance of the classes is unequal and known (e.g., classification costs, or more popular categories), this information could be used to skew the probability distribution.

Figure 2:
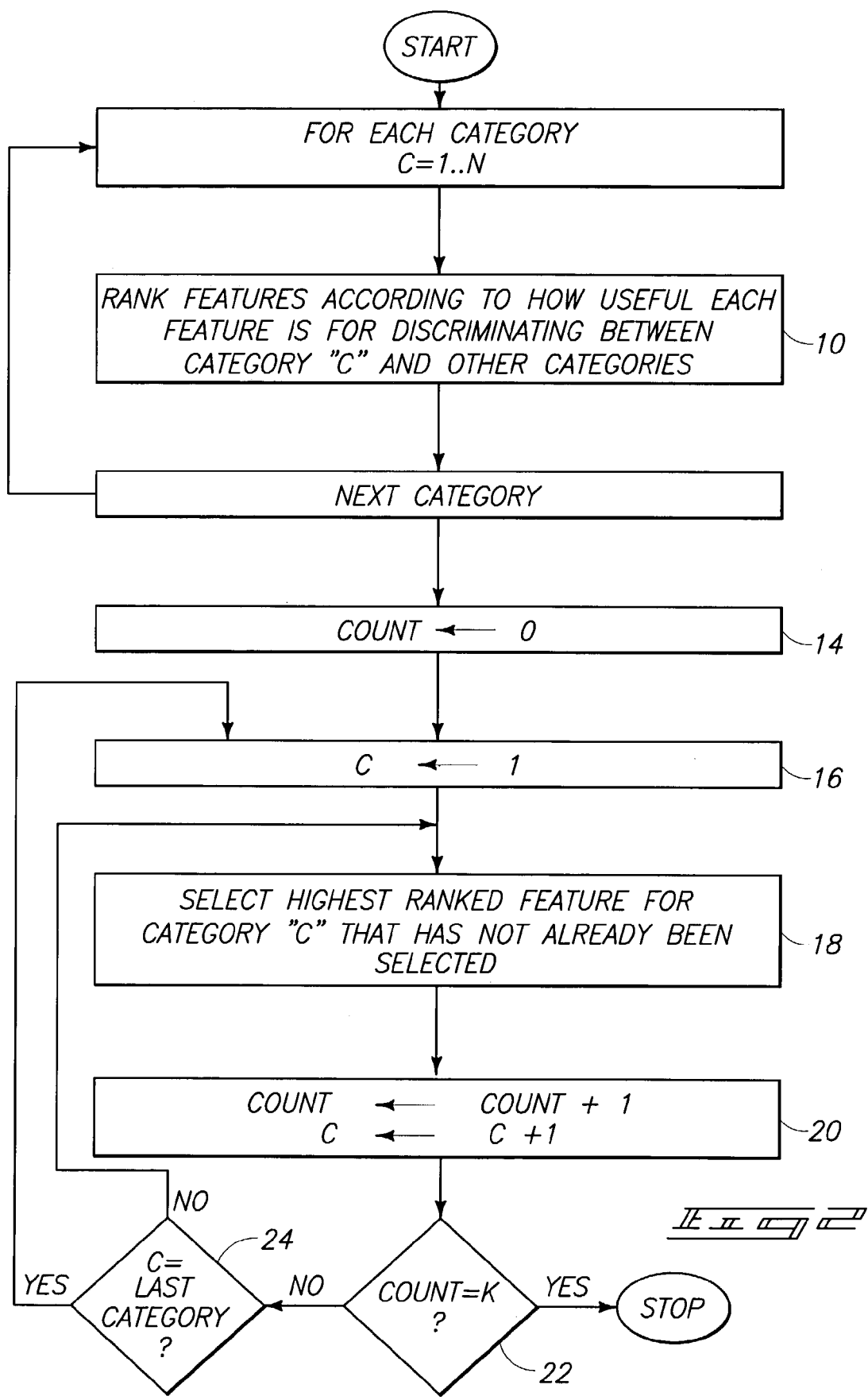
FIG. 2 is a flowchart illustrating a method in accordance with various alternative embodiments.

Note that each feature appears on the ranked list for each category so duplicates will be encountered as this method proceeds. Thus, in the procedure above (step 12), it may take >k round-robin rounds to select k features. In accordance with alternative embodiments shown in FIG. 2, when it is time to select a feature for category C, if its proposed feature is already included among the selected features, one could optionally walk down the list seeking a feature that is not already included (see steps 16, 18, 20, and 24 in FIG. 2). In other words, in some embodiments, when selecting a feature for a category C, if the highest ranked feature for that category is already included among selected features, the highest ranked feature for that category is selected that has not already been selected. Steps 14, 20, and 22 in FIG. 2 illustrate a counter "COUNT" that can be used to keep track of the size of the output list and to stop adding features to the output list after a predetermined number K has been reached.

In some embodiments, some categories are much larger than others; i.e., have many more records than others. Therefore, in some embodiments, illustrated in FIG. 3, it may be desirable to grant those categories additional rounds to propose features. The following variation, referred to as the "prio" method (priority scheduling), has been tested on the round-robin method and found to yield good results. There may be other variations that perform well.

```
list ranking[N]; - for each category, a ranked list of features
double mass[N]; - for each category, the number of training examples
in that category (or estimated future distribution to be encountered)
    for each category C = 1..N {              ; (see 44 in FIG. 3)
        mass[C] = number of training examples in category C ; (46)
        ranking[C] = ExistingFeatureRankingMethod( category C vs. all other
categories)                                    ; (48)
    }                                          ; (50)
    list output; - list of output features
    while (output does not yet contain k features) {   ; (54)
        select the category C with the largest mass[C]  ; (56)
        mass[C] = mass[C]/2;                   ; (58)
        f = take best feature off of list ranking[C] for that category
        add f to the output list, unless it is already present  ; (60)
    }                                          ; (62)
```

While double precision is indicated for the variable mass [C], single precision is also possible. Additionally, different types of looping logic (while, for, counters), know in the art, could be used instead of the specifics illustrated, and alternative instructions or instruction sequences could be employed to achieve the same logical result.

If an estimate is available for the future testing class distribution that differs from the distribution in the example cases, the estimate can be used instead of the number of training examples in step 46, in various embodiments. Also, if there are differing costs for errors in different categories, the "mass" array can be weighted by the cost figures in various embodiments. For example, supposing 90% of all users of an auction website browse only the top five categories, then 90% of the mass can be assigned to these five categories (regardless of the distribution of items for sale). The cost of making classification errors in rarely viewed categories may be small compared to the cost of making classification errors in frequently viewed categories.

In still other embodiments, rather than comparing each category against all others, error-correcting encodings are used, as is known in the art. Error-correcting encodings are described, for example, in an article titled "Solving Multiclass Learning Problems via Error-Correcting Output Codes", Thomas G. Dietterich, et al., Journal of Artificial Intelligence Research (1995). Many people approach multiclass (as opposed to binary) classification problems by creating a separate binary classifier to distinguish each class from all others. Then, at classification time, the classifier that is most confident is selected. However, considering a 4-class problem, binary classifiers could instead be trained to distinguish various groupings of classes; e.g., one classifier distinguishes items in (class 1 or 2) vs. (class 3 or 4), while another classifier is trained to distinguish a different partitioning. To build a multi-class classifier according to an error-correcting code in this manner, the features for each of these binary classifiers are optimized for these partitions (instead of optimizing it for distinguishing each class from all others).

The use of round-robin in step 12 gives each category an equal number of features to include in the list. But there are times where this is sub-optimal. For some categories, performance may be optimum with just some number (e.g., twenty) of features and, after that, performance declines. In these situations, it would be better to have such a category stop suggesting features after its optimal number of features has been covered. Therefore, in alternative embodiments, by some means (e.g. cross-validation as one example, well known in the practice) the optimum "number" of features is determined for each category separately. The list of ranked feature suggestions is truncated at that optimal point. During the round-robin (or other scheduling algorithm) selection of step 12, after a list has been exhausted for a given category, then that category is out of the running for the remainder of the process; i.e. it offers no more suggested features (e.g.; in some implementations its mass[c]:=0, so that it will not be picked any more).

Embodiments of the invention provide a computer system 100 for performing the analysis described above. Other aspects provide computer program code, embodied in a computer readable media, for performing the analysis described above. Other embodiments provide computer program code embodied in a carrier wave for performing the analysis described above.

Figure 4:
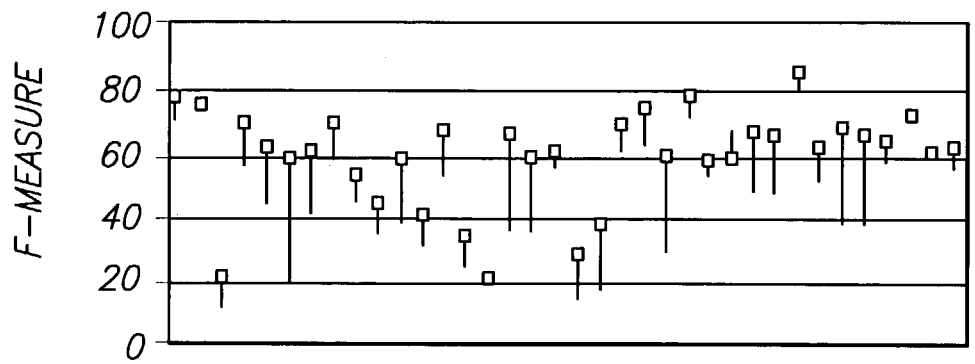
FIG. 4 is a graph of F-measure achieved using various embodiments.

FIG. 4 is a whisker graph showing the F-measure (average of precision and accuracy) achieved for each of 36 classes in an example problem. The large end of each whisker shows the F-measure achieved by methods in accordance with FIG. 1, and the small end of each whisker shows the F-measure achieved by the traditional Information Gain method (using Naïve Bayes as the classification algorithm in all cases). An improvement is seen for most categories.

Figure 5:
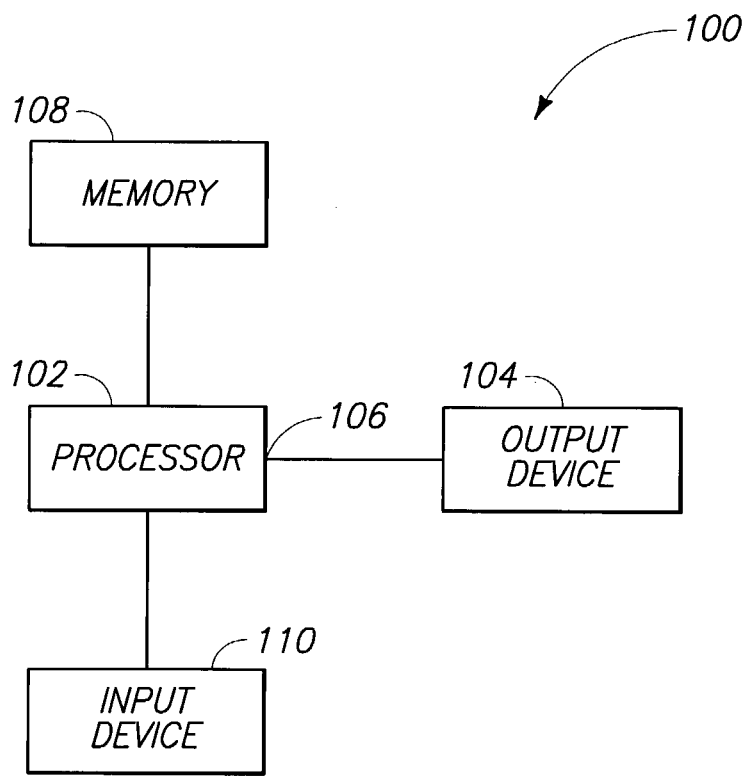
FIG. 5 is a block diagram of a system in accordance with various embodiments.

FIG. 5 shows a system 100 for performing the analysis described above. The system 100 includes a processor 102, an output device 104 coupled to the processor 102 via an output port 106, a memory 108 embodying computer program code for carrying out the logic described above and in connection with FIG. 5, an input device 110 for inputting (or retrieving from memory) benchmark problems or new problems, and conventional components as desired. The memory 108 comprises, in various embodiments, random access memory, read only memory, a floppy disk, a hard drive, a digital or analog tape, an optical device, a memory stick or card, or any other type of memory used with computers or digital electronic equipment. Instead of operating on computer program code, digital or analog hard wired logic is used instead, in alternative embodiments.

Operation of the methods described above may be better understood by considering FIGS. 6 and 7. While FIGS. 6 and 7 illustrate specific features and specific classes or categories, the invention is not limited to any specific features, categories, number of features, or number of categories.

FIGS. 6 and 7 illustrate a three-class example. More particularly, FIGS. 6 and 7 illustrate a problem of separating emails into 3 categories: SPAM, news subscriptions, and "other."

The top word features for SPAM might be:
1. free
2. you
3. your
4. money
5. fast The top features for news subscriptions might be:
1. CNN
2. news
3. weather
4. KDnuggets
5. Iraq The top features for OTHER might be:
1. project
2. meeting
3. patent
4. you
5. RE:

The round-robin method would take features in this order: free, CNN, project, you, news, meeting, your, weather, patent, money, KDnuggets, ("you" is already included so, depending on which variant of round-robin is being used, "RE:" is selected, or else continue with the next class).

Figure 3:
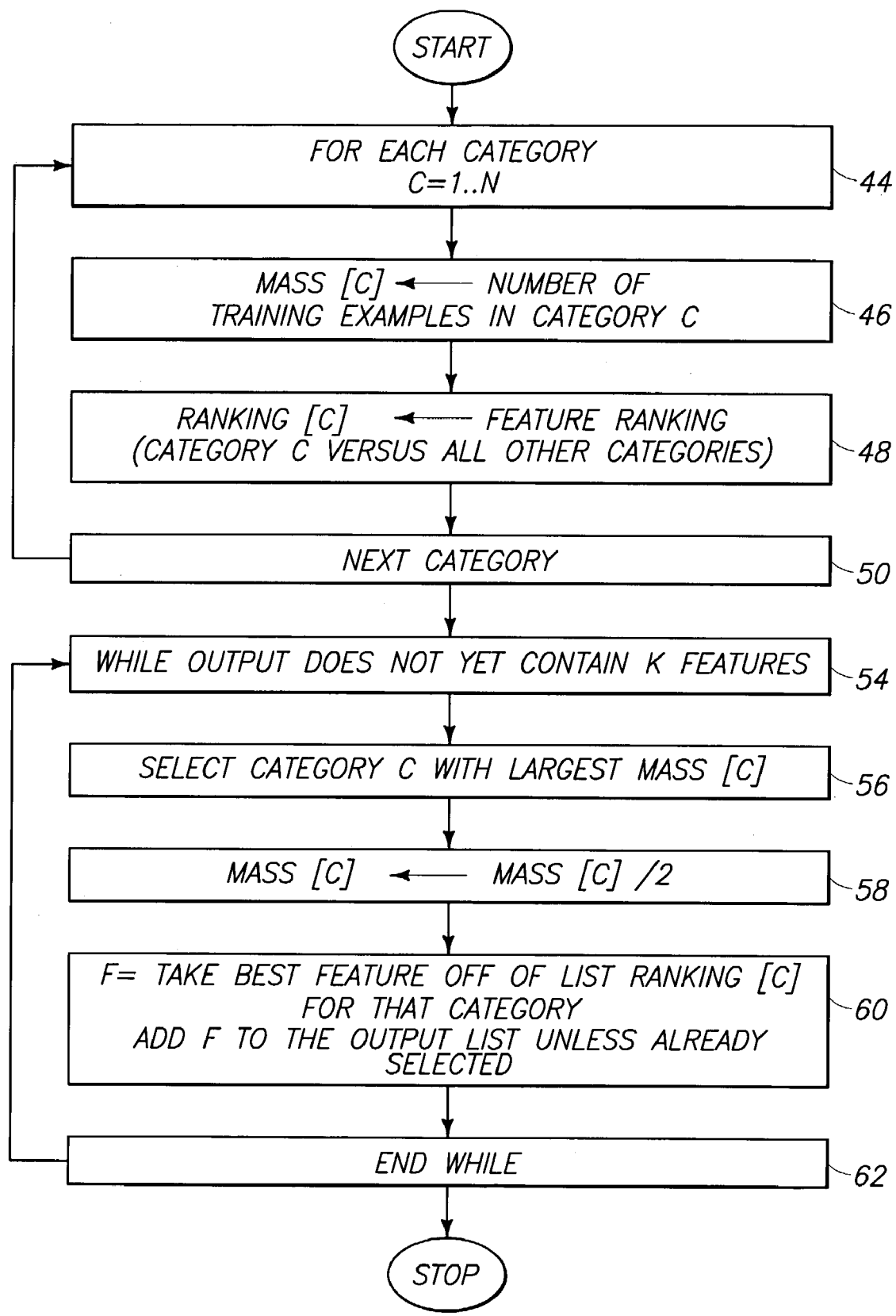
FIG. 3 is a flowchart illustrating a method in accordance with various other alternative embodiments.

The method of FIG. 3, assuming that OTHER has a little over twice as many items as the other two categories, would take the features: project, meeting, patent (note how it focused on OTHER three times, dividing its remaining mass down to equivalent size as the remaining two classes, so it continues in round-robin style), free, CNN, you, (duplicate "you" for SPAM class optionally skips down its list to include "your", or else just continues with the next class), news, RE:, . . . as illustrated in FIG. 8.

While embodiments of the invention have been described above, it is to be understood, however, that the invention is not limited to the specific features shown and described, since the means herein disclosed comprise preferred forms of putting the invention into effect. The invention is, therefore, claimed in any of its forms or modifications within the proper scope of the appended claims appropriately interpreted in accordance with the doctrine of equivalents.

What is claimed is:

1. A computer-implemented feature selection method for selecting a predetermined number of features for a set of binary partitions over a set of categories given a dataset of feature vectors associated with the categories, the method comprising:
for each binary partition under consideration, ranking features using two-category feature ranking; and
while the predetermined number of features has not yet been selected:
picking a binary partition p;
selecting a feature based on the ranking for binary partition p for using the selected feature in training a classifier for classifying data into categories; and
adding the selected feature to an output list if not already present in the output list and removing the selected feature from further consideration for the binary partition p.

2. A method in accordance with claim 1 wherein each binary partition under consideration comprises one of the categories versus all other of the categories.

3. A method in accordance with claim 1 wherein the binary partitions under consideration comprise divisions of the categories according to error-correcting code.

4. A method in accordance with claim 1 wherein picking a binary partition comprises using round-robin turn-taking, and wherein selecting the feature comprises selecting the highest ranked remaining feature for the binary partition.

5. A method in accordance with claim 1 wherein picking a binary partition comprises selecting randomly according to a probability distribution over the binary partitions and wherein selecting the feature comprises selecting the highest ranked remaining feature for the binary partition.

6. A method in accordance with claim 1 wherein ranking features using two-category feature ranking comprises using at least one of Information Gain, Chi-Squared, Odds Ratio, Document Frequency, and Bi-Normal Separation.

7. A method in accordance with claim 1 wherein the features are text features for text classification.

8. A method in accordance with claim 1 wherein, when selecting a feature for a binary partition, if the highest ranked feature for that binary partition is already included among selected features, the highest ranked feature for that binary partition is selected that has not already been selected.

9. A method in accordance with claim 1 wherein the predetermined number of features includes a larger number of features for some binary partitions than for other binary partitions.

10. A method in accordance with claim 9 wherein ranking features using two-category feature ranking comprises determining the desired number of features for each partition.

11. A method in accordance with claim 9 comprising applying weighting factors to respective binary partitions, wherein selecting a binary partition comprises selecting a binary partition having the highest weighting factor.

12. A method in accordance with claim 11 and further comprising adjusting the weighting factor of the selected binary partition after selecting the binary partition having the highest weighting factor.

13. A method in accordance with claim 11, further comprising setting the weighting factors using at least one of distribution of feature vectors in the partitions, estimated future distribution of features in the partitions, and distribution of cost factors among respective partitions.

14. A memory embodying computer program code for feature selection for a plurality of categories, the computer program code when executed by a processor, causing the processor to:

for each category, rank features according to feature ranking for two-category problems; and until the predetermined number of features has been selected:

pick a category c;

select a feature based on the ranking for category c and using the selected feature in training a classifier for classifying data into categories; and add the selected feature to an output list if not already present in the output list and remove the selected feature from further consideration for the category c.

15. A memory in accordance with claim 14 wherein the computer program code is configured to cause the processor to select the highest ranked features for each of the categories round-robin until the predetermined number of features is selected.

16. A memory in accordance with claim 14 wherein the computer program code is configured to cause the processor to select the highest ranked features for each of the categories rand-robin until the predetermined number of features is selected.

17. A memory in accordance with claim 14 wherein the computer program code is configured to cause the processor to rank features comprises using at least one of Information Gain, Chi-Squared, Odds Ratio, Document Frequency, and bi-normal separation.

18. A memory in accordance with claim 14 wherein the features are text features for text classification.

19. A memory in accordance with claim 14 wherein, when selecting a feature for a category, if the highest ranked feature for that category is already included among selected features, the computer program code is configured to cause the processor to select the highest ranked feature for that category that has not already been selected.

20. A memory in accordance with claim 14 wherein the predetermined number of features includes a larger number of features for some categories than for other categories.

21. A memory in accordance with claim 20 wherein the computer program code is configured to cause the processor to apply weighting factors to respective categories based on the number of features per category, and to select a feature from a category having the highest weighting factor, then reduce the weighting factor from the category from which the feature was selected.

22. A memory in accordance with claim 20 wherein the computer program code is configured to cause the processor to apply weighting factors to respective categories based on an estimated future category distribution different from the number of features per category, and to select a feature from a category having the highest weighting factor, then reduce the weighting factor from the category from which the feature was selected.

23. A memory in accordance with claim 21 wherein the computer program code is configured to cause the processor to adjust weighting factors for the respective categories by cost factors for the respective categories.

24. A computer-implemented system for selecting a predetermined number of features for text classification for use in training a text classifier for classifying text into categories and that has learning abilities, the system comprising:

means for ranking features according to feature ranking for two-category problems, for each category;

means for picking a category c, and for selecting a feature based on the ranking for category c for using the selected feature in training a classifier for classifying data into categories while the predetermined number of features has not yet been selected; and means for adding the selected feature to an output list if not already present in the output list and removing the selected feature from further consideration for the category c.

25. A system in accordance with claim 24 wherein the means for picking a category and the means for selecting a feature comprise means for selecting the highest ranked features for each of the categories round-robin until the predetermined number of features is selected.

26. A system in accordance with claim 24 wherein the means for picking a category and means for selecting a feature comprise means for selecting the highest ranked features for each of the categories rand-robin until the predetermined number of features is selected.

27. A system in accordance with claim 24 wherein the means for ranking features comprises means for using at least one of Information Gain, Chi-Squared, Odds Ratio, Document Frequency, and bi-normal separation.

28. A system in accordance with claim 24 wherein, when selecting a feature for a category, if the highest ranked feature for that category is already included among selected features.

29. A system in accordance with claim 24 wherein the predetermined number of features includes a larger number of features for some categories than for other categories.

30. A system in accordance with claim 29 and comprising means for applying weighting factors to respective categories based on the number of features per category, wherein the means for selecting a feature comprises means for selecting a feature from a category having the highest weighting factor, then reducing the weighting factor from the category from which the feature was selected.

31. A system in accordance with claim 29 and comprising means for applying weighting factors to respective categories based on an estimated future category distribution different from the number of features per category, wherein the means for selecting a feature comprises means for selecting a feature from a category having the highest weighting factor, then reducing the weighting factor from the category from which the feature was selected.

32. A system in accordance with claim 30 and comprising means for adjusting the weighting factors by cost factors for the respective categories.

* * * * *